US008107960B2

(12) United States Patent
Oba et al.

(10) Patent No.: US 8,107,960 B2
(45) Date of Patent: Jan. 31, 2012

(54) PRIORITIZED QUERY

(75) Inventors: Yoshihiro Oba, Englewood Cliffs, NJ (US); Yuu-Heng Alice Cheng, Piscataway, NJ (US); Subir Das, Kendall Park, NJ (US); Kenich Taniuchi, Kawasaki (JP)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 980 days.

(21) Appl. No.: 11/944,624

(22) Filed: Nov. 25, 2007

(65) Prior Publication Data

US 2008/0176567 A1 Jul. 24, 2008

Related U.S. Application Data

(60) Provisional application No. 60/886,158, filed on Jan. 23, 2007.

(51) Int. Cl.
*H04W 36/00* (2009.01)

(52) U.S. Cl. ........ 455/436; 455/445; 455/450; 455/451; 455/453

(58) Field of Classification Search .................. 455/445, 455/450, 451, 453
See application file for complete search history.

(56) References Cited

U.S. PATENT DOCUMENTS

| | | | | |
|---|---|---|---|---|
| 7,702,289 | B2 * | 4/2010 | Tzavidas et al. | 455/69 |
| 2004/0103282 | A1 * | 5/2004 | Meier et al. | 713/171 |
| 2005/0101328 | A1 * | 5/2005 | Son et al. | 455/436 |
| 2005/0191993 | A1 * | 9/2005 | Laumen et al. | 455/412.1 |
| 2006/0140150 | A1 * | 6/2006 | Olvera-Hernandez et al. | 370/331 |
| 2006/0229075 | A1 * | 10/2006 | Kim et al. | 455/436 |
| 2006/0277298 | A1 * | 12/2006 | Kim et al. | 709/224 |
| 2007/0105585 | A1 * | 5/2007 | Lee et al. | 455/525 |
| 2007/0115899 | A1 * | 5/2007 | Ovadia et al. | 370/338 |

OTHER PUBLICATIONS

A. Centonza, E. Hepworth: "IE prioritization for query response size limit support DCN 21-07-0831-00-0000" IEEE 802.21 Media Independent Handover Services, Jan. 16, 2007, pp. 1-10, XP002481484 London, UK.

* cited by examiner

*Primary Examiner* — Nimesh Patel
(74) *Attorney, Agent, or Firm* — Westerman, Hattori, Daniels & Adrian, LLP

(57) ABSTRACT

According to some of the preferred embodiments, a solution framework is employed that includes defining of a mechanism to run multiple queries in a single message exchange, along with a priority on a per-query basis. In some embodiments, a system for facilitating handover of a mobile device across heterogeneous access networks by ensuring response to queries transmitted by the mobile device includes: a) a mobile device having a plurality of wireless network interfaces for communicating over a plurality of heterogeneous access networks, having a media independent handover (MIH) entity to facilitate handovers between the heterogeneous networks, and configured to transmit queries related to handover operation between the heterogeneous access networks to MIH entities within said heterogeneous access networks; and b) said media independent handover entity of said mobile device being configured to transmit multiple queries in a single message exchange to an MIH entity in an access network with prioritization among said multiple queries.

21 Claims, 6 Drawing Sheets

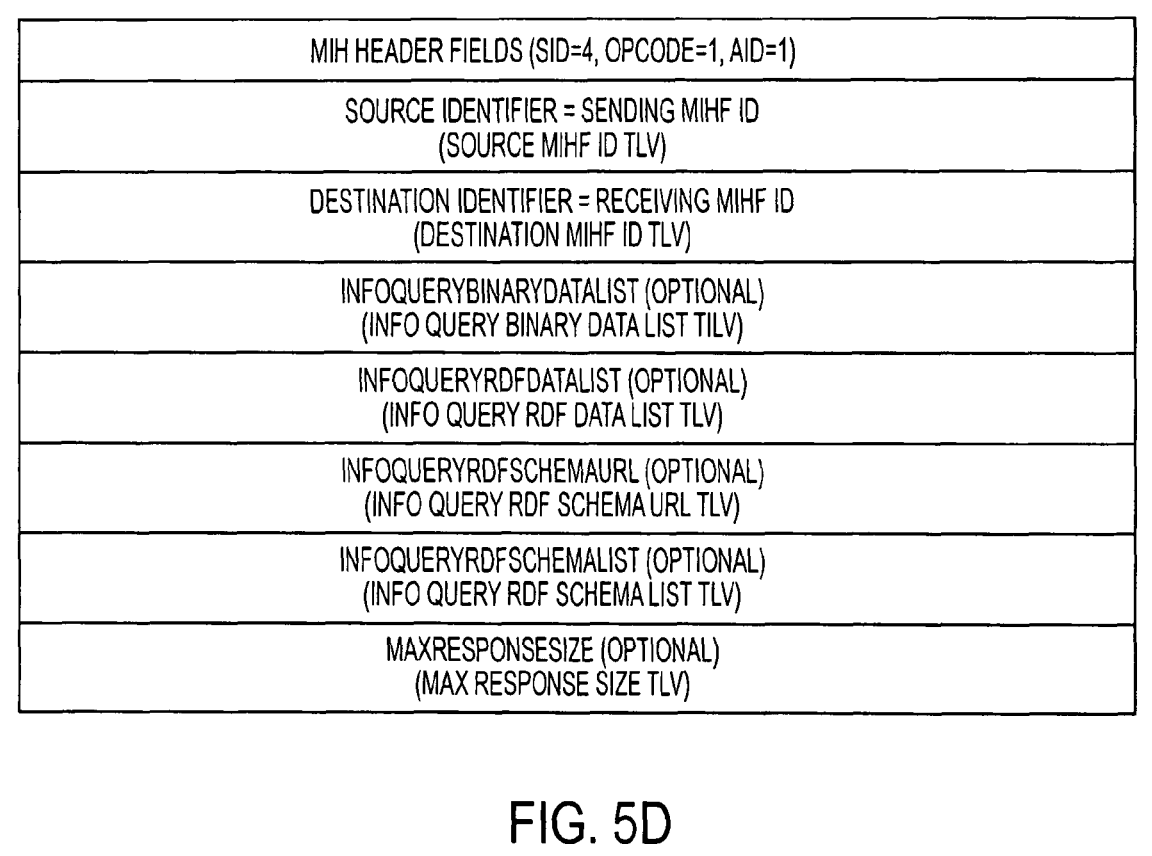

| |
|---|
| MIH HEADER FIELDS (SID=4, OPCODE=1, AID=1) |
| SOURCE IDENTIFIER = SENDING MIHF ID<br>(SOURCE MIHF ID TLV) |
| DESTINATION IDENTIFIER = RECEIVING MIHF ID<br>(DESTINATION MIHF ID TLV) |
| INFOQUERYBINARYDATALIST (OPTIONAL)<br>(INFO QUERY BINARY DATA LIST TILV) |
| INFOQUERYRDFDATALIST (OPTIONAL)<br>(INFO QUERY RDF DATA LIST TLV) |
| INFOQUERYRDFSCHEMAURL (OPTIONAL)<br>(INFO QUERY RDF SCHEMA URL TLV) |
| INFOQUERYRDFSCHEMALIST (OPTIONAL)<br>(INFO QUERY RDF SCHEMA LIST TLV) |
| MAXRESPONSESIZE (OPTIONAL)<br>(MAX RESPONSE SIZE TLV) |

FIG. 5D

PRIORITIZED QUERY

CLAIM FOR PRIORITY

The present application claims priority under 35 U.S.C. 119 to prior provisional application Ser. No. 60/886,158, filed Jan. 23, 2007, entitled Prioritized Query, to Y. Oba, et al., the entire disclosure of which is incorporated herein by reference.

BACKGROUND

Background Applications (No Priority Claimed)

The entire disclosures of each of the following U.S. Non-Provisional and U.S. Provisional Patent Applications are incorporated herein by reference: Ser. No. 11/267,590, filed on Nov. 7, 2005, entitled Network Discovery Mechanisms; and Ser. No. 10/761,243 entitled Mobility Architecture Using Pre-Authentication, Pre-Configuration and/or Virtual Soft-Handoff, filed on Jan. 22, 2004.

Field of the Invention

The present application relates to wireless networking and, in some preferred embodiments, to systems and methods for overcoming querying issues in wireless networks and/or the like.

General Background Discussion

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier.

IP is a connectionless protocol. The connection between end points during a communication is not continuous. When a user sends or receives data or messages, the data or messages, are divided into components known as packets. Every packet is treated as an independent unit of data.

In order to standardize the transmission between points over the internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components; a transceiver (i.e., a transmitter and a receiver, including, e.g., a single chip transceiver with an integrated transmitter, receiver and, if desired, other functions); an antenna, a processor; one or more audio transducers (for example, a speaker or a microphone as in devices for audio communications), electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable hand held devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term “IP name” refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

I.E.E.E 802.21 Standard:

The IEEE 802.21 standard supports different handover methods. Such methods are generally classified as 'hard' or 'soft', depending on whether the handover procedure is "break-before-make" or "make-before-break" with respect to the data transport facilities that support the exchange of data packets between the mobile node and the network. Handover decision-making involves cooperative use of both mobile node and network infrastructure.

The IEEE 802.21 standard defines services that enhance handovers between heterogeneous access links.

1. A Media Independent Event Service (MIES) which provides event classification, event filtering and event reporting corresponding to dynamic changes in link characteristics, link status, and link quality.

2. A Media Independent Command Service (MICS) which enables MIH Users to manage and control link behavior relevant to handovers and mobility.

3. A Media Independent Information Service (MIIS) which provides details on the characteristics and services provided by the serving and neighboring networks. The information enables effective system access and effective handover decisions.

An MIHF provides asynchronous and synchronous services through well-defined Service Access Points (SAPs) for link layers and MIH Users. (MIHF is a logical entity that facilitates handover decision making. MIH Users make handover decisions based on inputs from the MIHF.) In the case of a system with multiple network interfaces of arbitrary type, the MIH Users may use the Event Service, Command Service and Information Service provided by MIHF to manage, determine, and control the state of the underlying interfaces.

These services provided by MIHF help the MIH Users in maintaining service continuity, service adaptation to varying quality of service, battery life conservation, network discovery, and link selection. In a system containing heterogeneous network interfaces of IEEE 802 types and cellular (3GPP, 3GPP2) types, the MIHF may help the MIH Users to implement effective procedures to couple services across heterogeneous network interfaces. MIH Users may utilize services provided by the MIHF across different entities to query resources required for a handover operation between heterogeneous networks.

MIH services in mobile nodes facilitate seamless handovers between heterogeneous networks. An MIH User such as a mobility management protocol (e.g., Mobile IP) could be supported for handover and seamless session continuity. This shall not preclude other protocols in addition to Mobile IP and even other MIH Users from making use of MIH services to optimize handovers.

An illustrative network model including MIH services is shown in FIG. 1 to better illustrate the MIH Communication Reference Points. Moving from right to left, the model includes an MIH-capable mobile node (MN, far right) that supports multiple wired and wireless access technologies. The model assumes that the serving network either operates multiple link-layer technologies or allows its user to roam into other networks when a service level agreement (SLA) in support of inter-working has been established. The model illustrates access networks that are connected in some loose, serial way to a given core network. (i.e., Core Operator 1, 2, or 3).

Also depicted is an access network that is more tightly coupled (Access Network-3). Each Core Operator network (1, 2, or 3) might represent a service provider, corporate intranet provider, or just another part of the visited or home access. In this depicted model the provisioning provider is operating Access Network-3, which couples the terminal to the core (labeled Home Core Network) via R1.

At any given point in time, the subscriber's serving network may be the home network or a visited network. The network providers offer MIH services in their access networks (Access Network-1 to 4) in order to facilitate heterogeneous handovers into their networks. Each access technology either advertises its MIH capability or responds to MIH service discovery. Each service provider for these access networks allows access to one or more MIH Points of Service (PoS) node(s). These PoS nodes may provide some or all of the MIH services as determined during the MIH capabilities discovery. The PoS location may vary based on the operator deployment scenario and the technology-specific MIH architecture.

An MIH PoS may reside next to, or co-located with, the point of attachment (PoA) node in the access network (e.g., Access Network 1, 2, 4). Alternatively, the PoS may reside deeper inside the access or core networks (e.g., Access Network 3). As shown in FIG. 3, the MIH entity in the MN can communicate with MIH network entities using reference points R1, R2, or R3 over any of the available access network. If the PoA in the serving access network has a co-located MIHF, the R1 reference connection terminates at the PoA which is also the PoS (MN to Access Network 1, 2, 4 of the model can all be R1). In that case an R3 reference connection would be terminated at any non-PoA (illustrated by MN connectivity to Access Networks 1, 2, 4). MIH events may originate at both sides of an active R1 link. The MN is typically the first node to react to these events.

The interaction of visited and home networks could be either for control and management purposes or for data transport purposes. It is also possible that due to roaming or SLA agreements, the home network may allow the MN to access the public Internet directly through a visited network. As illustrated, two MIH network entities may communicate with each other via R4 or R5 reference points. The MIH capable PoA may also communicate with other MIH network entities via R4 and R5 reference points. The MIH capable MN could have an MIH communication with other PoA in the candidate access networks via R2 reference point to obtain information Services about the candidate network.

With regard to the MIH Information Service, visited providers can offer access to their information server located in an MIH PoS node (upper far left). The operator provides the MIIS to mobile nodes so they can obtain pertinent information including, but not limited, to new roaming lists, costs, provider identification information, provider services, priorities and any other information that would enable the selection and utilization of these services. As illustrated, it is possible for the mobile node to be pre-provisioned with MIIS data by its provider. Also possible is for the mobile node to obtain MIH Information Services from any access network of its provider or visited networks that maintain SLA agreements with the provisioner. MIIS could also be available from another overlapping or nearby visited network, using that network's MIIS point of service. The serving network may utilize R4 and R5 interfaces to access other MIH entities. As an example, in FIG. 3 the home network may access its own MIH information server or core operator 1 (visited network) MIH information server.

The IEEE 802.21 standard supports the Media independent Event service, Media Independent Command service and Media Independent Information service. The MIH Protocol defines the format of the messages (i.e. MIHF packet with header and payload) that are exchanged between remote MIHF entities and the transport mechanisms that support the delivery of the messages. The selection of the transport mechanism is dependent on the access technology that connects the MN to the network and the location of the MIH PoS.

The packet payload for these services may be carried over L2 management frames, L2 data frames or other higher layer protocols. Wireless networks such as 802.11 and 802.16 have a management plane and support management frames which could be suitably enhanced for carrying the above payloads. However, the wired Ethernet network does not have management plane and may carry the above payloads only in data frames.

The IEEE 802.21 standard defines the packet format and payloads in media independent manner in standard TLV (Time-Length-Value) format. See, e.g., FIG. 5(C) illustrating standard TLV format. Thereafter, these packets may be encapsulated in a L2 MIH Protocol using MIHF Ethertype when the payload needs to be sent over normal data frames as in case of Ethernet. In other cases the TLV based messages and payload may be directly encapsulated in media specific management frames. Alternatively, MIH protocol messages may be encapsulated using a lower layer (L2) or a higher layer (L3 and above) transport.

The IEEE 802.21 standard defines the format of MIH Protocol data unit (PDU) header and payload. Standard TLV format provides media-independent representation for the PDU payload contents. The MIHF PDUs are encapsulated in data frames with MIHF Ethertype over 802 links. For 802.11 and 802.16 links extensions of media-specific management frames are recommended for carrying MIH messages. No assumptions are made in this standard regarding the transport of MIH messages over 3SGPP and 3GPP2 access links at L2.

MIHF Transactions and Messages:

An MIHF transaction involves combination of an MIHF Request or Indication message and the corresponding MIHF Response message (if applicable) that are exchanged between two MIHF peers. It is required to match each request message that is sent by the initiator with its response message. Acknowledgement messages associated with this message exchange are also part of the transaction.

In MIH protocol messages, all TLV definitions are always aligned on an octet boundary and hence no padding is required. FIG. 5(A) shows the components of the MIH protocol frame. With reference to FIG. 5(B), the MIH protocol header carries the essential information which is present in every frame and is important for parsing and analyzing the MIH protocol frame.

The following TLV encoding can be used for parameters in MIH Protocol Messages. The Type field is one octet. The format of the Length field shall be per the "definite form" of ITU-T X.690. Specifically, if the actual length of the Value field is less than or equal to 127 octets, then a) the length of the Length field shall be one octet, b) the MSB of the Length field shall be set to 0, and c) the other 7 bits of the Length field shall be used to indicate the actual value of the Value field in octets.

If the length of the Value field is more than 127 octets, then: a) the length of the Length field shall be one octet more than what is actually used to indicate the length of the Value field in octets; b) the MSB of the first octet of the length field shall be set to 1; c) the other 7 bits of the first octet of the length field shall be used to indicate the number of additional octets of the Length field (i.e., excluding the first octet); and d) the remaining octets (i.e., excluding the first octet) of the Length field shall be used to indicate the actual length of the Value field. TLV type values shall be unique. TLV encoding start at 1 and subsequent values are assigned in ascending order.

All MIH messages carry a source MIHF ID followed by a destination MIHF ID as the first two TLVs of the MIH protocol payload part of the message. By way of example, an MIH_Get_Information request message is used by an MIHF to retrieve a set of Information Elements provided by the information service. A single MIH_Get_Information request message can carry multiple queries of a combination of Binary, RDF_Data, RDF_Schema_URL and RDF_Schema types. An illustrative MIH_Get_Information message format is shown in FIG. 5(D).

Illustrative Computer Architectures:

FIG. 2 depicts some illustrative architectural components that can be employed in some illustrative and non-limiting implementations including wireless access points to which client devices communicate. In this regard, FIG. 2 shows an illustrative wireline network 20 connected to a wireless local area network (WLAN) generally designated 21. The WLAN 21 includes an access point (AP) 22 and a number of user stations 23, 24. For example, the wireline network 20 can include the Internet or a corporate data processing network. For example, the access point 22 can be a wireless router, and the user stations 23, 24 can be, e.g., portable computers, personal desktop computers, PDAs, portable voice-over-IP telephones and/or other devices. The access point 22 has a network interface 25 linked to the wireline network 21, and a wireless transceiver in communication with the user stations 23, 24. For example, the wireless transceiver 26 can include an antenna 27 for radio or microwave frequency communication with the user stations 23, 25. The access point 22 also has a processor 28, a program memory 29, and a random access memory 31. The user station 23 has a wireless transceiver 35 including an antenna 36 for communication with the access point station 22. In a similar fashion, the user station 24 has a wireless transceiver 38 and an antenna 39 for communication to the access point 22. By way of example, in some embodiments an authenticator could be employed within such an access point (AP) and/or a supplicant or peer could be employed within a mobile node or user station.

FIG. 3 shows an illustrative computer or control unit that can be used to implement computerized process steps, to be carried out by devices, such as, e.g., an access point, a user station, a mobile node or other node in some embodiments. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

While a variety of systems and methods are known, there remains a need for improved systems and methods, including, e.g., systems and methods for improving the ability to gain network access.

SUMMARY

The present invention overcomes various limitations and deficiencies in the background art.

According to some of the preferred embodiments, a solution framework is employed that includes defining of a mechanism to run multiple queries in a single message exchange. In some preferred examples, multiple query requests are contained in a single request message and multiple query responses for the multiple query requests are contained in a single response message. In I.E.E.E. 802.21 Information Service, this mechanism is already defined, but without any prioritizing among multiple queries.

According to some of the preferred embodiments, the solution framework defines priority on a per-query basis. In some of the preferred embodiments, there are two potential approaches.

According to a first approach, each query request is tagged with a priority value (e.g., explicit prioritization).

According to a second approach, the query requests in a request message are ordered based on priority (e.g., implicit prioritization). For example, higher priority query requests can be followed by lower priority ones in the request message. In this regard, the query responses for higher priority query requests will have a greater chance to be included in a response message than that for lower priority ones, when the maximum response size does not afford to include all of them.

According to some embodiments, a system for facilitating handover of a mobile device across heterogeneous access networks by ensuring response to queries transmitted by the mobile device includes: a) a mobile device having a plurality of wireless network interfaces for communicating over a plurality of heterogeneous access networks, having a media independent handover (MIH) entity to facilitate handover between the heterogeneous networks, and configured to transmit queries related to handover operation between the heterogeneous access networks to MIH entities within the heterogeneous access networks; and b) the media independent handover entity of the mobile device being configured to transmit multiple queries in a single message exchange to an MIH entity in an access network with prioritization among the multiple queries.

According to some embodiments, a method for facilitating handover of a mobile device across heterogeneous access networks by ensuring response to queries transmitted by the mobile device, comprising: a) providing a mobile device having a plurality of vireless network interfaces for communicating over a plurality of heterogeneous access networks, having a media independent handover (MIH) entity to facilitate handovers between the heterogeneous networks, and configured to transmit queries related to handover operation between the heterogeneous access networks to MIH entities within the heterogeneous access networks; and b) the mobile device transmitting multiple queries in a single message exchange to an MIH entity in an access network with prioritization among the multiple queries.

In some examples, the mobile device is configured to tag at least some of the multiple queries with a priority value. In some examples, the tags are included in at least one TLV within the message. In some examples, the tags are included in a reserved octet of a TLV value field of the at least one TLV. In some examples, the tags are included in a first octet of a TLV value field to indicate a pority. In some examples, the mobile device is configured such that queries in a request message are ordered based on priority. In some examples, the mobile device is configured to arrange at least some higher priority queries in advance of lower priority queries, such that the query responses for such higher priority query requests will have a greater chance to be included in a response message. In some examples, the MIH entity in the mobile device and the MIH entity in the access network are configured to employ IEEE 802.21 protocols.

The preferred embodiments of the invention can achieve the following and/or other advantages:

First, a querier (e.g., which makes the query) can obtain as much information as possible within a given response size limit.

Second, existing query languages do not have to be changed (e.g., existing query languages can be employed without changing).

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are described by way of example in reference to the accompanying drawings, in which:

FIG. 5(D) is a diagram showing an illustrative message from the IEEE 802.21 Standard.

DETAILED DESCRIPTION OF THE PREFERRED EMBODIMENTS

While the present invention may be embodied in many different forms, a number of illustrative embodiments are described with the understanding that the present disclosure is to be considered as providing examples of the principles of the various inventions described herein and that such examples are not intended to limit the invention to preferred embodiments described herein and/or illustrated herein.

Existing Problems

Figure 1:
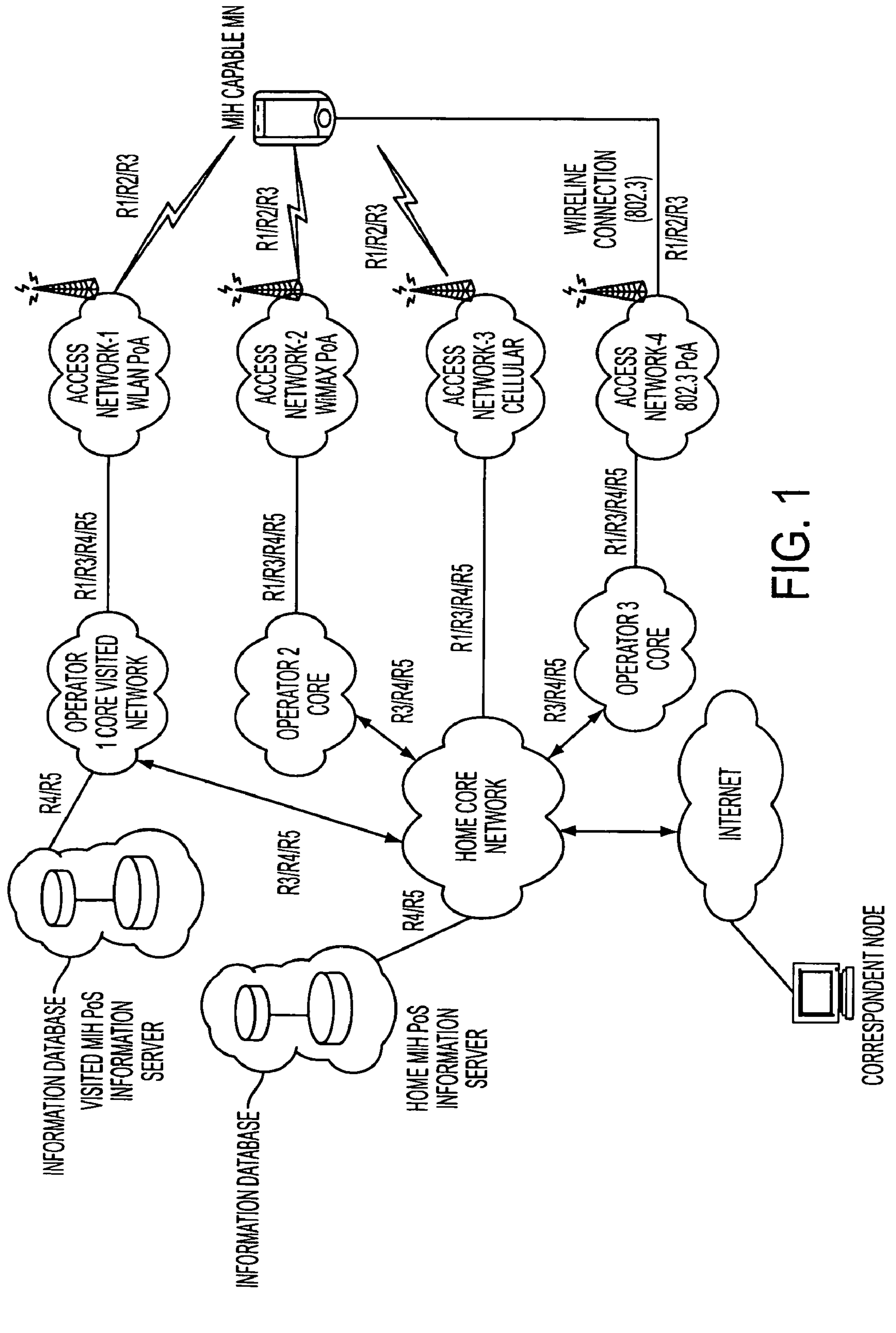
FIG. 1 is an illustrative network model from the IEEE 802.21 Standard for reference.
Figure 2:
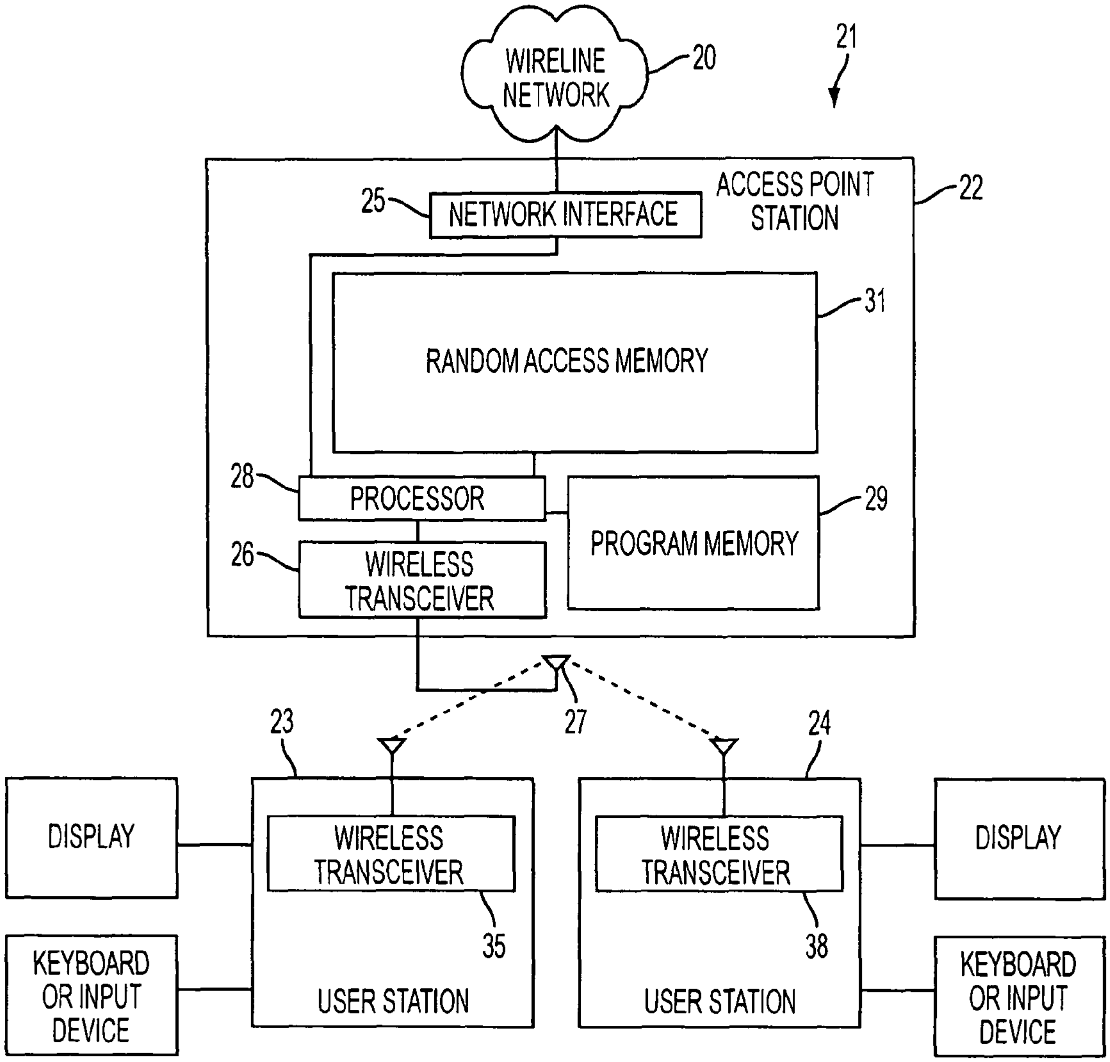
FIG. 2 depicts some illustrative architectural components that can be employed in some illustrative and non-limiting implementations including wireless access points to which client devices communicate.
Figure 3:
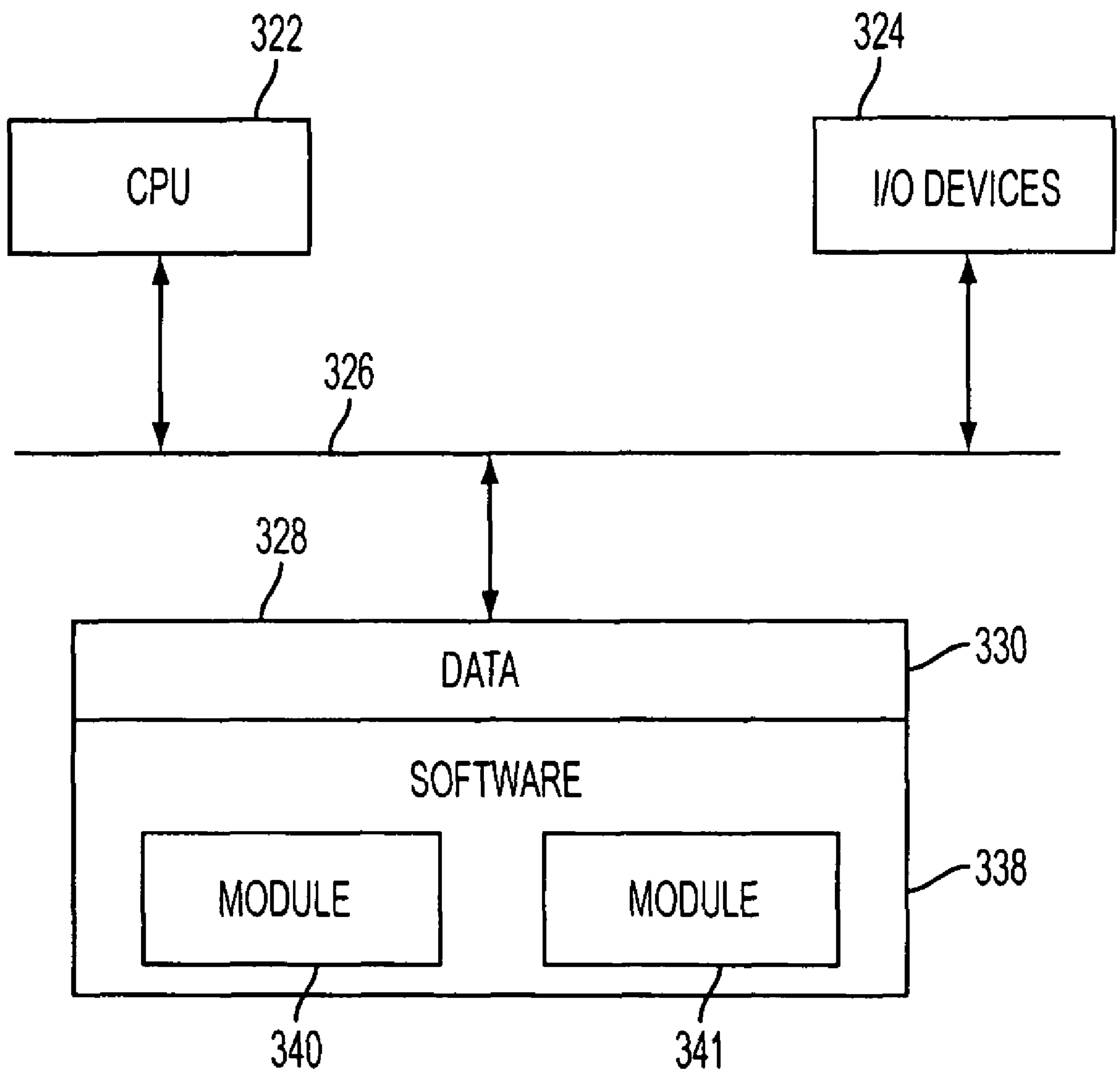
FIG. 3 shows an illustrative computer or control unit that can be used to implement computerized process steps, to be claimed out by devices, such as, e.g., an access point, a user station, a mobile node or other node in some embodiments.
Figure 4:
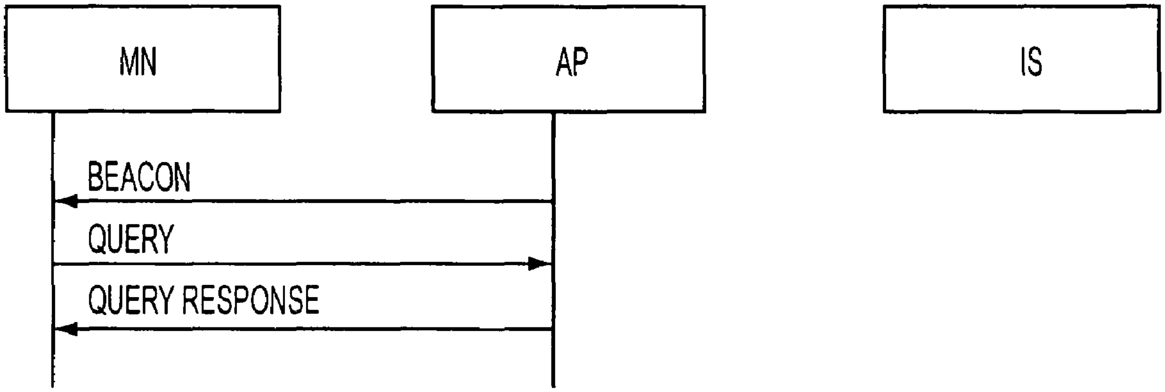
FIG. 4 is a diagram showing illustrative communications between a mobile node (MN) and other network entities.
Figure 5A:
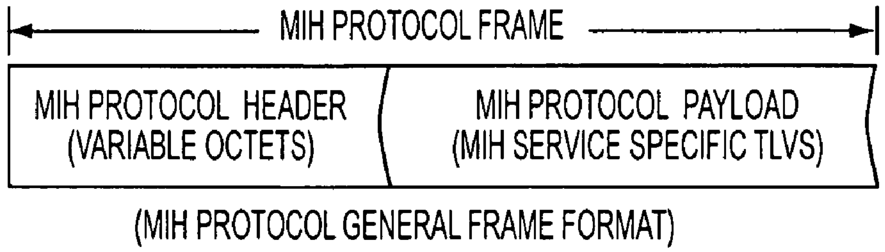
FIG. 5(A) is a diagram showing an illustrative MIH protocol general frame format from the IEEE 802.21 Standard.
Figure 5B:
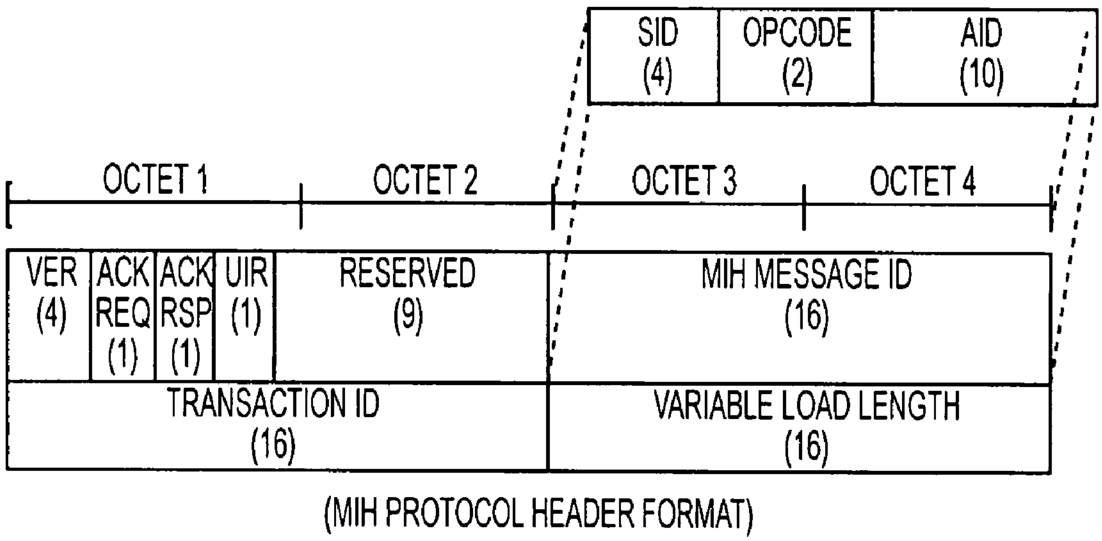
FIG. 5(B) is a diagram showing an illustrative MIH protocol header format from the IEEE 802.21 Standard.
Figure 5C:
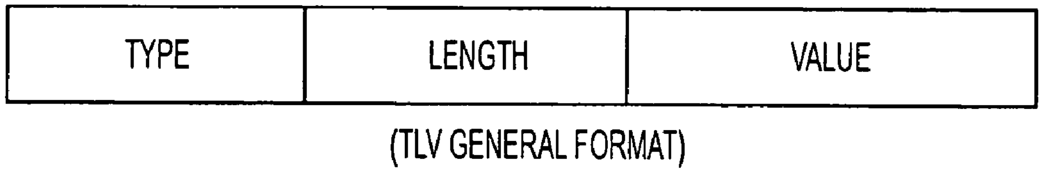
FIG. 5(C) is a diagram showing an illustrative TLV format.

Under 802.21, as described above, communications include, e.g., queries and responses to such queries. For example, a mobile node (MN) can transmit a query to, e.g., an Access Point (AP) or to an Information Server (IS) in some examples (such as, e.g., shown in FIG. 4). However, in the existing art, there are some cases in which a larger query can be problematic. For example, there are some cases in which there is a limit on query response size. For example, an access network can impose limits on the size. By way of example, 802.11u employs Generic Advertising Service (GAS) in which a size limit is imposed.

In this regard, if the size of the generated response is larger than the maximum response size, then the entire query with fail. Moreover, despite such a failure, the query would consume a certain amount of network resources.

The Preferred Solutions

To address the above and other issues, according to some of the preferred embodiments, a prioritized query approach is employed. In some examples, for such an approach, less important pieces of information are removed from the query response until the query response is of an appropriate size. For example, less important pieces of information can be removed from the query response until the resulting response size is larger than the maximum response size (e.g., such that the resutting query response can be made not larger than the maximum response size).

According to some of the preferred embodiments, a solution framework is employed that includes defining of a mechanism to run multiple queries in a single message exchange. In some preferred examples, multiple query requests are contained in a single request message and/or multiple query responses for the multiple query requests are contained in a single response message. In I.E.E.E. 802.21 information Service, a mechanism for providing, e.g., such multiple query requests is already defined, but without providing for any prioritization among multiple queries, See, e.g., IEEE P802.21™/D04.00, Draft Standard for Local and Metropolitan Area Networks: Media Independent Handover Services, February, 2007, at 7.6.27.1.2, section Semantics of service primitive, which indicates "InfQueryType, TLV When this InfoQueryType is specified, the InfoQueryParameters shall be a binary string which encodes Information Element TLVs that carry requests as defined in clauses 6.4.6.1 and 6.4.6.2." See also the current draft as of August, 2007, which states, e.g., "[a] single MIH_Get_Information request message can carry multiple queries of a combination of Binary, RDF_Data, RDF_Schema_URL and RDF_Schema types." IEEE P802.21™/D7.1, Draft Standard for Local and Metropolitan Area Networks: Media Independent Handover Services, August 2007, at 8.6.4.1 "MIH_Get_Information request." The entire disclosures of these two draft standard documents related to IEEE 802.21 are incorporated herein by reference.

As indicated, the draft standard allows multiple queries in a single request, but the draft standard does not contemplate anything about prioritization among multiple queries in a request. Prior to the present invention, there was no such query language that supported prioritized query.

According to some of the preferred embodiments, the query responses for higher priority query requests will have a greater chance to be included in a response message than that for lower priority ones by incorporating a mechanism to differentiate multiple queries in a single request on a priority basis.

According to the preferred embodiments, the solution framework defines priority on a per-query basis. In some of the preferred embodiments, there are two potential approaches.

Tagged Approach

According to a first approach, each query request is tagged with a priority value (e.g., explicit prioritization).

In order to tag a priority request, preferably the message format is modified to include such tags. In some embodiments, the tags can be achieved by, for example, reserving an octet (such as, e.g., the first octet) of a TLV Value field to indicate a priority. In this illustrative manner, 255 levels of priorities could be represented. For background reference (see also above discussion in background of this document), it is noted that in data communication protocols information may be encoded as a Type-Length-Value or TLV element inside of the protocol. By way of example, type and length fields are typically fixed in size (e.g., a few bytes) and the value field is typically variable size. These fields typically used as follows: type—a numeric code which indicates the kind of field that this part of the message represents; length—the size of the value field (typically in bytes); and value—variable sized set of bytes which contains data for this part of the message. Some of the general advantages of using a TLV representation include TLV sequences are easily searched using generalized parsing functions; and new message elements which are received at an older node can be safely skipped and the rest of the message can be parsed.

In order to employ the functionality of this Tagged Approach, the sender of the request (e.g., for example a mobile device) is preferably configured (such as, e.g., with appropriate programming) to perform the functions of this embodiment to, e.g. a) transmit multiple queries in a single request and b) to tag such queries according to priority. In this regard, the priority can be assigned, e.g., based on predefined rules and/or user input or user guidelines. In addition, the receiver of the request can also be modified (such as, e.g., with appropriate programming) to a) identify queries by priority and b) to ensure that higher priority queries are, e.g., addressed in a response message. In some embodiments, the sender of the request can also be configured so as to separate a single query into multiple queries (e.g., based on predefined rules), and to tag such separate queries by priority.

Ordered Approach

According to a second approach, the query requests in a request message are ordered based on priority (e.g., implicit prioritization). For example, higher priority query requests can be followed by lower priority ones in the request message. In this regard, the query responses for higher priority query requests will have a greater chance to be included in a response message than that for lower priority ones, when the maximum response size does not afford to include all of them.

In this approach, the sender of the query requests in a request message (such as, e.g., a mobile device) would have programming to modify the order of the query requests. The sender of the multiple queries has knowledge about which query is more important than others, and it orders the queries based on the knowledge. In this regard, for example, the priority (e.g., order) can be assigned, e.g., based on predefined rules and/or user input or guidelines. In addition, the receiver of the request can also be configured (such as, e.g., with appropriate programming) to a) identify queries received in order by priority and b) to ensure that higher priority queries are, e.g., addressed in a response message. In some embodiments, the sender of the request can also be configured so as to separate a single query into multiple queries (e.g., based on predefined rules), and to send such queries in a particular order based on by priority.

While said tagged approach and said ordered approach are employed independently in some preferred embodiments, some embodiments could be employed incorporating both tagged and ordered approaches (for example, such that an implicit priority could be applied based on order while priority could also be tagged for some queries).

While the above disclosure describes certain queries and responses between illustrative entities (e.g., mobile devices and other network entities), it should be understood based on this disclosure that aspects of the invention can be employed in other queries and/or responses between other appropriate entities, such as, e.g., between other MIH entities under 802.21.

The preferred embodiments of the invention can achieve the following and/or other advantages:

First, a querier (e.g., which makes the query) can obtain as much information as possible within a given response size limit.

Second, existing query languages do not have to be changed (e.g., existing query languages can be employed without changing).

According to some embodiments, queries and responses can include queries and responses as described within the above-noted pending U.S. non-provisional patent applications.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term “preferably” is non-exclusive and means “preferably, but not limited to.” In this disclosure and during the prosecution of this application, means-plus-function or step-plus-function limitations will only be employed where for a specific claim limitation all of the following conditions are present in that limitation: a) “means for” or “step for” is expressly recited; b) a corresponding function is expressly recited; and c) structure, material or acts that support that structure are not recited. In this disclosure and during the prosecution of this application, the terminology “present invention” or “invention” may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology “embodiment” can be used to describe any aspect, feature, process or step, any combination thereof, and/or any portion thereof, etc. In some examples, various embodiments may include overlapping features. In this disclosure, the following abbreviated terminology may be employed, “e.g.” which means “for example.”

What is claimed is:

1. A system for facilitating handover of a mobile device across heterogeneous access networks by ensuring response to queries transmitted by the mobile device, comprising:

a) a mobile device having a plurality of wireless network interfaces for communicating over a plurality of heterogeneous access networks, having a media independent handover (MIH) entity to facilitate handovers between the heterogeneous networks, and configured to transmit queries related to handover operation between the heterogeneous access networks to MIH entities within said heterogeneous access networks; and b) said media independent handover entity of said mobile device being configured to transmit multiple queries in a single message exchange to an MIH entity in an access network with prioritization among said multiple queries, said prioritization identifying respective priorities of the queries of said multiple queries to establish which of said queries shall be responded to in a single query response message that has a response to a low priority query removed when said single query response cannot accommodate responses to all of said multiple queries.

2. The system of claim 1, wherein said mobile device is configured to tag at least some of said multiple queries with a priority value.

3. The system of claim 2, wherein said tags are included in at least one TLV within said message.

4. The system of claim 3, wherein said tags are included in a reserved octet of a TLV value field of said at least one TLV.

5. The system of claim 4, wherein said tags are included in a first octet of a TLV value field to indicate a priority.

6. The system of claim 1, wherein said mobile device is configured such that queries in a request message are ordered based on priority.

7. The system of claim 6, wherein said mobile device is configured to arrange at least some higher priority queries in advance of lower priority queries, such that the query responses for such higher priority query requests will have a greater chance to be included in a response message.

8. The system of claim 1, wherein said MIH entity in an access network is within an Information Server.

9. The system of claim 1, wherein said MIH entity in an access network is within an Access Point.

10. The system of claim 1, where said MIH entity in said mobile device and said MIH entity in said access network are configured to employ IEEE 802.21 protocols.

11. The system of claim 1, wherein said mobile device is configured to include said prioritization such as to identify less important pieces of information to be removed from a query response until the query response is not larger than a maximum response size.

12. A method for facilitating handover of a mobile device across heterogeneous access networks by ensuring response to queries transmitted by the mobile device, comprising:

a) providing a mobile device having a plurality of wireless network interfaces for communicating over a plurality of heterogeneous access networks, having a media independent handover (MIH) entity to facilitate handovers between the heterogeneous networks, and configured to transmit queries related to handover operation between the heterogeneous access networks to MIH entities within said heterogeneous access networks; and b) said mobile device transmitting multiple queries in a single message exchange to an MIH entity in an access network with prioritization among said multiple queries, said prioritization identifying respective priorities of the queries of said multiple queries to establish which of said queries shall be responded to in a single query response message that has a response to a low priority query removed when said single query response cannot accommodate responses to all of said multiple queries.

13. The method of claim 12, further including said mobile device tagging at least some of said multiple queries with a priority value.

14. The method of claim 13, further including providing said tags in at least one TLV within said message.

15. The method of claim 14, further including providing said tags in a reserved octet of a TLV value field of said at least one TLV.

16. The method of claim 12, further including said mobile device ordering at least some of said queries in said request message based on priority.

17. The method of claim 16, further including arranging at least some higher priority queries in advance of lower priority queries, such that the query responses for such higher priority query requests will have a greater chance to be included in a response message.

18. The method of claim 12, further including said MIH entity in said mobile device and said MIH entity in said access network employing IEEE 802.21 protocols.

19. The method of claim 12, including said mobile device using said prioritization to identify less important pieces of information to be removed from a query response until the query response is not larger than a maximum response size, and further including said mobile device receiving said single query response message with said less important pieces of information removed from the query response such that the query response is not larger than the maximum response size.

20. The method of claim 12, further including an MIH entity in said access network transmitting a single query response message with responses to a plurality of said multiple queries but with a response to said low priority query removed on the basis of a) said prioritization provided by said mobile device and b) said single query response not being large enough to accommodate responses to all of said multiple queries.

21. The method of claim 20, further including employing said single message of said mobile device with said multiple queries and said single message of said MIH entity in said access network with said query response within IEEE 802.21 message exchanges.

* * * * *